United States Patent
Tsai et al.

(10) Patent No.: US 8,300,568 B2
(45) Date of Patent: Oct. 30, 2012

(54) TRANSMITTER, RECEIVER, MULTI-CLASS MULTIMEDIA BROADCAST/MULTICAST SERVICE SYSTEM AND MODULATION METHOD THEREOF

(75) Inventors: Yuh-Ren Tsai, Hsinchu (TW); Yen-Chen Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 356 days.

(21) Appl. No.: 12/727,078

(22) Filed: Mar. 18, 2010

(65) Prior Publication Data
US 2011/0110283 A1    May 12, 2011

(30) Foreign Application Priority Data
Nov. 6, 2009   (TW) ............................... 98137750 A

(51) Int. Cl.
*H04H 60/02*   (2008.01)
*H04J 3/26*   (2006.01)
*H04B 7/216*   (2006.01)
*H04L 27/02*   (2006.01)
*H04L 23/02*   (2006.01)

(52) U.S. Cl. ........ 370/312; 370/432; 370/342; 370/344; 370/208; 375/261; 375/260; 375/273

(58) Field of Classification Search .................. 370/312, 370/432, 342–343, 203, 208, 210, 493, 498, 370/206–207, 344–343, 252; 375/260, 261, 375/273, 283, 298
See application file for complete search history.

(56) References Cited

U.S. PATENT DOCUMENTS

| | | | | | |
|---|---|---|---|---|---|
| 6,154,484 | A | * | 11/2000 | Lee et al. | 375/130 |
| 7,305,043 | B2 | * | 12/2007 | Milbar et al. | 375/295 |
| 7,876,337 | B2 | * | 1/2011 | Shiomi et al. | 345/660 |
| 8,144,174 | B2 | * | 3/2012 | Shiomi et al. | 345/698 |
| 2006/0120474 | A1 | * | 6/2006 | Hong et al. | 375/261 |
| 2006/0141951 | A1 | * | 6/2006 | Wallace et al. | 455/101 |
| 2008/0292017 | A1 | * | 11/2008 | Wetzker et al. | 375/295 |
| 2009/0017757 | A1 | * | 1/2009 | Koga et al. | 455/62 |
| 2011/0026522 | A1 | * | 2/2011 | Hsu | 370/390 |

* cited by examiner

*Primary Examiner* — Kwang B Yao
*Assistant Examiner* — Candal Elpenord
(74) *Attorney, Agent, or Firm* — Muncy, Geissler, Olds & Lowe, PLLC

(57) ABSTRACT

A multi-class multimedia broadcast/multicast service (MBMS) system includes a transmitter and at least one receiver. The transmitter transmits N primary signals by N primary channels and an auxiliary signal by an auxiliary channel, wherein a resolution of the auxiliary signal is identical to the highest resolution of the N primary signals and the constellation mappings of the auxiliary signal and the primary signal with the highest resolution among said N primary signals on the corresponding modulation constellations are coupled. The receiver couples the primary signal with the corresponding auxiliary/virtual auxiliary signal to obtain a lower-resolution virtual auxiliary signal, which can also be coupled with the primary signal having the same resolution. Therefore, receiving quality of each resolution is improved by combining the primary signal and the corresponding auxiliary/virtual auxiliary signal.

29 Claims, 4 Drawing Sheets

TRANSMITTER, RECEIVER, MULTI-CLASS MULTIMEDIA BROADCAST/MULTICAST SERVICE SYSTEM AND MODULATION METHOD THEREOF

BACKGROUND OF THE INVENTION

1. Field of the Invention

The present invention relates to a transmitter, a receiver, a multi-class multimedia broadcast/multicast service system and modulation method thereof, and more particularly to a transmitter, a receiver, a multi-class multimedia broadcast/multicast service system and modulation method thereof for transmitting multi-class or multi-resolution data.

2. Description of the Prior Art

With enhancement in available bandwidth per user due to rapid development of mobile communication systems, demand for multimedia streaming services has been dramatically increased. Multimedia broadcast/multicast service (MBMS) system, which provides unidirectional point-to-multipoint service supporting data streams with different resolutions, has been proposed. The MBMS system is capable of eliminating bandwidth consumption by sharing radio resources and simultaneously providing desired services for a plurality of users.

However, streams with different resolutions are regarded as separate services in conventional MBMS systems and transmitted via independent radio resources, resulting in degradation in receiving efficiency. Therefore, it is now a current goal to achieve an improved overall system throughput, service coverage and signal-receiving quality.

SUMMARY OF THE INVENTION

The present invention is directed to provide a transmitter, a receiver, a multi-class multimedia broadcast/multicast service system and a modulation method thereof. The present invention couples a primary signal, and an auxiliary/virtual auxiliary signal having the same resolution to obtain a virtual auxiliary signal with a lower resolution and processes one of the N primary signals and an auxiliary signal/virtual auxiliary signal by diversity combining to improve the receiving quality so as to improve the overall system throughput and to extend the service coverage.

According to one embodiment of the present invention, a multi-class multimedia broadcast/multicast service system includes a transmitter and at least one receiver. The transmitter is configured for transmitting N primary signals via N primary channels (N is a positive integer) and an auxiliary signal via an auxiliary channel, wherein a resolution of the auxiliary signal is identical to the highest resolution of the N primary signals, and constellation mappings of the auxiliary signal and one of the N primary signals having the highest resolution among the N primary signals are coupled to form a corresponding modulation constellation mapping with a lower resolution. The receivers are configured for coupling the auxiliary/virtual auxiliary signal and one of the N primary signals having the same resolution to obtain the virtual auxiliary signal with a lower resolution; demodulating one of the N primary signals and the auxiliary/virtual auxiliary signal of a certain resolution based on the corresponding constellation mappings; and processing one of the N primary signals and the auxiliary/virtual auxiliary signal by diversity combining to obtain desired information, and if there is no primary signal of a corresponding resolution, the receiver demodulates the auxiliary/virtual auxiliary signal independently to obtain desired information.

According to another embodiment of the present invention, a transmitter pairs with at least one receiver to form a multi-class multimedia broadcast/multicast service system. The transmitter is configured for transmitting N primary signals via N primary channels (N is a positive integer) and an auxiliary signal via an auxiliary channel, wherein a resolution of the auxiliary signal is identical to the highest resolution of the N primary signals, and constellation mappings of the auxiliary signal and one of the N primary signals having the highest resolution among the N primary signals are coupled to form a corresponding modulation constellation mapping with a lower resolution.

According to yet another embodiment of the present invention, a receiver pairs with the above-mentioned transmitter to form a multi-class multimedia broadcast/multicast service system. The receiver is configured for coupling one of the N primary signals and the auxiliary/virtual auxiliary signal having the same resolution to obtain the virtual auxiliary signal with a lower resolution; demodulating one of the N primary signals and the auxiliary/virtual auxiliary signal of a certain resolution based on the corresponding modulation constellation mappings; and processing one of the N primary signals and the auxiliary/virtual auxiliary signal by diversity combining to obtain desired information, and if there is no primary signal of a corresponding resolution, the receiver demodulates the auxiliary/virtual auxiliary signal independently to obtain desired information.

According to still another embodiment of the present invention, a modulation method for transmitting multi-resolution data includes transmitting N primary signals via N primary channels (N is a positive integer) and an auxiliary signal via an auxiliary channel, wherein a resolution of the auxiliary signal is identical to the highest resolution of the N primary signals, and the constellation mappings of the auxiliary signal and one of the N primary signals having the highest resolution can be coupled to form a corresponding modulation constellation mapping with a lower resolution; coupling the auxiliary signal and the primary signal having the highest resolution among the N primary signals to obtain a virtual auxiliary signal with a lower resolution; and demodulating one of the N primary signals and the auxiliary signal based on the corresponding modulation constellation mappings, wherein the virtual auxiliary signal and one of the N primary signals having the same resolution are coupled based on the corresponding modulation constellation mappings; and processing one of the N primary signals and the auxiliary/virtual auxiliary signal by diversity combining to obtain desired information, and if there is no primary signal of a corresponding resolution, the receiver demodulates the auxiliary/virtual auxiliary signal independently to obtain desired information.

Other advantages of the present invention will become apparent from the following description taken in conjunction with the accompanying drawings, wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
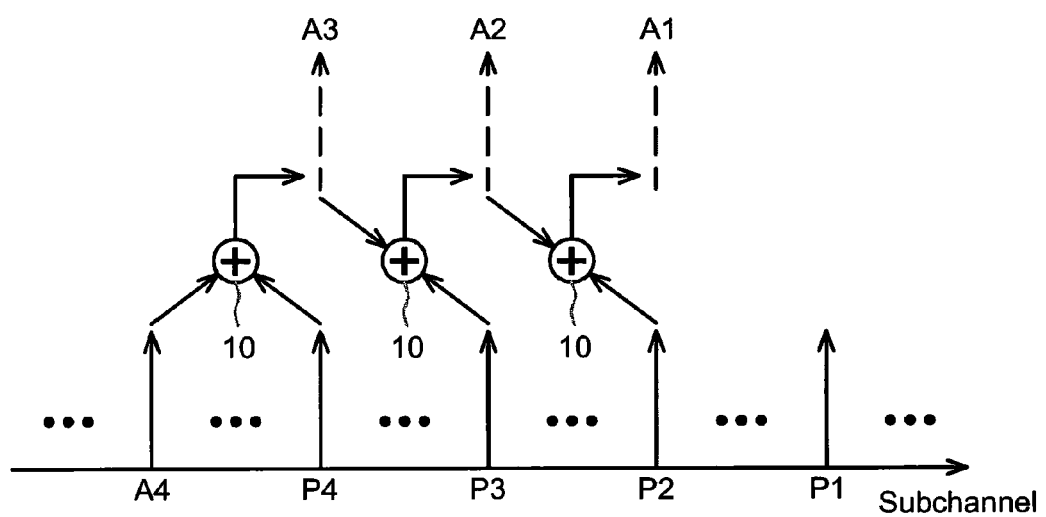
FIG. 1 is a schematic diagram illustrating a scheme of modulation method for transmitting multi-resolution data according to one embodiment of the present invention.

A modulation method for transmitting multi-resolution data is provided according to one embodiment of the present invention and includes following steps. N primary signals with different resolutions are respectively transmitted via N primary channels (N is a positive integer) and an auxiliary signal is transmitted via an auxiliary channel. The resolution of the auxiliary signal is identical to the resolution of the primary signal having the highest resolution, and the constellation mappings of the auxiliary signal and the primary signal with the highest resolution can be coupled to form a corresponding modulation constellation mapping with a lower resolution. The auxiliary signal and the primary signal having the highest resolution are coupled to obtain a virtual auxiliary signal with a lower resolution, and the primary signal and the auxiliary signal are obtained by demodulation based on the corresponding modulation constellation mappings, wherein the constellation mappings of the virtual auxiliary signal and one of the primary signals having the same resolution can be coupled to form a corresponding modulation constellation mapping with a lower resolution. The primary signal and the auxiliary/virtual auxiliary signal are processed by diversity combining to obtain desired information. In one embodiment, the modulation method of the present invention further includes coupling the virtual auxiliary signal and the primary signal having the same resolution to obtain the virtual auxiliary signal with a lower resolution.

A multi-class multimedia broadcast/multicast service (MSBS) system according to one embodiment of the present invention includes a transmitter and at least one receiver. The transmitter respectively transmits N (a positive integer) primary signals with different resolutions via N primary channels and an auxiliary signal via an auxiliary channel. The resolution of the auxiliary signal is identical to the highest resolution of the N primary signals. In addition, the constellation mappings of the auxiliary signal and the primary signal with the highest resolution can be coupled to form a corresponding modulation constellation mapping with a lower resolution.

The receivers demodulate the primary signal and the auxiliary signal based on the corresponding modulation constellation mappings. The receivers process the auxiliary signal and one of the primary signals having the same resolution by diversity combining to obtain desired information. In addition, the receivers may also couple the primary signal having the highest resolution with the auxiliary signal to obtain a virtual auxiliary signal with a lower resolution, wherein the constellation mappings of the virtual auxiliary signal and the primary signal having the same resolution may be coupled to form a corresponding modulation constellation mapping with a lower resolution. The receivers therefore may process one of the N primary signals and the virtual auxiliary signal having the same resolution by diversity combining to obtain desired information. In case that there is no primary signal having the same corresponding resolution, the receivers may only demodulate the auxiliary/virtual auxiliary signal to obtain the desired information. Accordingly, the receivers may couple the primary signal and the virtual auxiliary signal having the same corresponding resolution to obtain the virtual auxiliary signal with a lower resolution.

Figure 2:
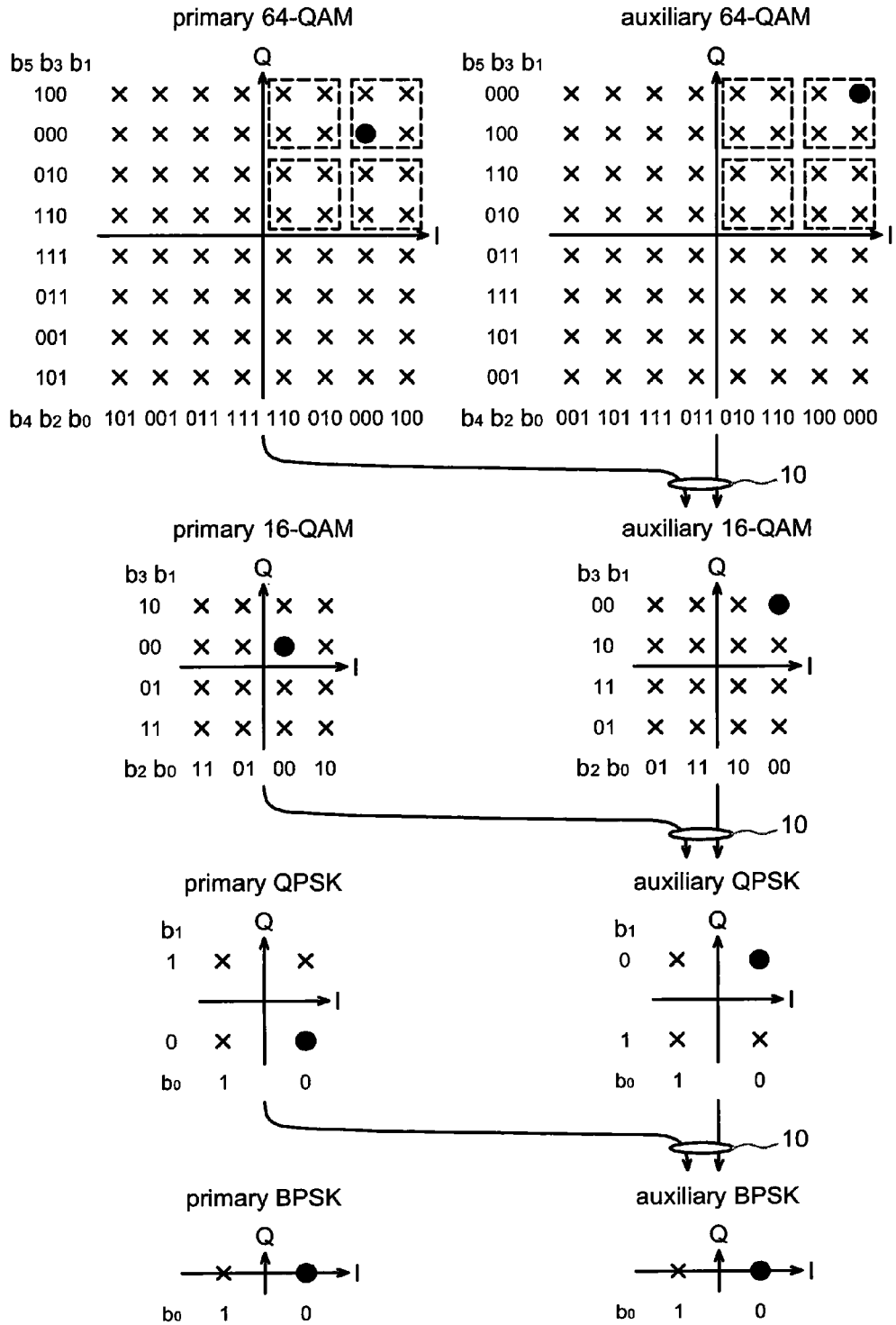
FIG. 2 is a schematic diagram illustrating a modulation constellation mapping scheme for transmitting multi-resolution data according to one embodiment of the present invention.

The MSBS system of the present invention is now described with an embodiment providing 4 classes of stream services with different resolutions. Referring to FIG. 1 and FIG. 2, the present embodiment adopts OFDM (Orthogonal Frequency-Division Multiplexing) or OFDMA (Orthogonal Frequency Division Multiple Access) systems, which convey information in channels with different frequency subcarriers, and the modulation techniques for different resolutions may be BPSK (Binary Phase Shift Keying), QPSK (Quadrature Phase Shift Keying), 16-QAM (16-Quadrature Amplitude Modulation) and 64-QAM (64-Quadrature Amplitude Modulation).

Referring to FIG. 1, primary channels P1~P4 are configured for transmitting class-1 to class-4 streaming services, respectively. The class-1 streaming service is used for providing the basic service quality for guaranteeing service accessibility within the whole service area, and the class-4 streaming service is used for providing the highest transfer rate of service data for best service quality. The transmission bits of the primary channels P1~P4 are assumed to be 1, 2, 4 and 6. The transmitted bit streams are denoted as $\{b_5\ b_4\ b_3\ b_2\ b_1\ b_0\}$, wherein the least significant bit (LSB) is used to represent the basic (lowest resolution) data and the other bits are represented as the additional information. Thus $\{b_0\}$ is denoted for class-1 streaming service, $\{b_1\ b_0\}$ for class-2 streaming service, $\{b_3\ b_2\ b_1\ b_0\}$ for class-3 streaming service and $\{b_5\ b_4\ b_3\ b_2\ b_1\ b_0\}$ for class-4 streaming service. The corresponding modulation constellation mapping of the primary channels P1~P4 are primary BPSK, primary QPSK, primary 16-QAM and primary 64-QAM, respectively (as illustrated in FIG. 2).

To improve the quality of receiving signal, as well as the service quality and service coverage, in addition to primary channel P4, class-4 streaming service utilizes an auxiliary channel A4 to transmit an auxiliary signal having the same resolution as the primary channel P4, where the corresponding modulation constellation mapping of the auxiliary channel A4 is auxiliary 64-QAM (as illustrated in FIG. 2) and the constellation mappings of the auxiliary signal and the primary signal having the highest resolution may be coupled to form a corresponding modulation constellation mapping with a lower resolution, i.e., auxiliary 16-QAM. In the receivers, the primary signal transmitted via the primary channel P4 and the auxiliary signal (i.e. the signal for class-4 streaming service) transmitted by the auxiliary channel A4 are processed by coupling 10 to obtain a virtual auxiliary signal, i.e. a signal in the virtual auxiliary channel A3. The corresponding modulation constellation mapping for the virtual auxiliary channel A3 is auxiliary 16-QAM, as illustrated in FIG. 2. Also, the constellation mappings of the virtual auxiliary signal in the virtual auxiliary channel A3 and the primary signal having the same resolution that is transmitted via the primary channel P3 may be coupled to form the corresponding modulation constellation mapping with a lower resolution.

Similarly, the virtual auxiliary signal in the virtual auxiliary channel A3, which is obtained by coupling, and the primary signal having the same resolution, that is transmitted via the primary channel P3, may be processed by coupling 10 to obtain a virtual auxiliary signal with a lower resolution, i.e.

a signal in the virtual auxiliary channel A2; and the virtual auxiliary signal in the virtual auxiliary channel A2, which is obtained by coupling, and the primary signal having the same resolution, that is transmitted via the primary channel P2, may be processed by coupling 10 to obtain a virtual auxiliary signal with a lower resolution, i.e. a signal in the virtual auxiliary channel A1. The corresponding modulation constellation mappings of the virtual auxiliary channels A2 and A1 are respectively auxiliary QPSK and auxiliary BPSK, as illustrated in FIG. 2. The constellation mappings of the virtual auxiliary signal in the virtual auxiliary channel A2 and the primary signal having the same resolution, that is transmitted via the primary channel P2, may be coupled to form the corresponding modulation constellation mapping with a lower resolution.

As fore-mentioned, each class of a streaming service includes two signals, the primary signal and the auxiliary/virtual auxiliary signal, and the receivers may process the primary signal and the auxiliary/virtual auxiliary signal by diversity combining to obtain desired information so as to dramatically improve service quality and service coverage. For example, transmission data $\{b_5\ b_4\ b_3\ b_2\ b_1\ b_0\} = \{0\ 0\ 0\ 0\ 0\ 0\}$. The class-1 to class-4 streaming service is transmitted via the primary channels P1~P4 and the auxiliary channel A4, the constellation point of the transmission data $\{0\ 0\ 0\ 0\ 0\ 0\}$ in the corresponding modulation constellation mapping is illustrated as the solid circle in FIG. 2. Since the primary 64-QAM modulation constellation mapping and the auxiliary 64-QAM modulation constellation mapping may be coupled, the constellation point of the transmission data $\{0\ 0\ 0\ 0\ 0\ 0\}$ in the primary 64-QAM constellation mapping and the constellation point of the transmission data $\{0\ 0\ 0\ 0\ 0\ 0\}$ in the auxiliary 64-QAM constellation mapping are coupled to obtain a constellation point equal to the constellation point of the transmission data $\{b_3\ b_2\ b_1\ b_0\} = \{0\ 0\ 0\ 0\}$ in the constellation mapping of the virtual auxiliary channel A3, wherein is located at the upper right position in the first quadrant of the auxiliary 16-QAM modulation constellation mapping.

Similarly, since the primary 16-QAM modulation constellation mapping and the auxiliary 16-QAM modulation constellation mapping may be coupled, the constellation point of the transmission data $\{0\ 0\ 0\ 0\}$ in the primary 16-QAM constellation mapping and the constellation point of the transmission data $\{0\ 0\ 0\ 0\}$ in the virtual auxiliary 16-QAM constellation mapping are coupled to obtain a constellation point equal to the constellation point of the transmission data $\{b_1\ b_0\} = \{0\ 0\}$ in the constellation mapping of the virtual auxiliary channel A2, wherein is located at the first quadrant of the auxiliary QPSK modulation constellation mapping.

At last, the primary signal transmitted via the primary channel P2 and the virtual auxiliary signal in the virtual auxiliary channel A2 are processed by coupling 10 to obtain transmission data with $\{b_0\} = \{0\}$, which is located at the right side of the auxiliary BPSK modulation constellation mapping. It is noted that the primary signal transmitted via the primary channel P1 and the virtual auxiliary signal in the virtual auxiliary channel A1, that is obtained by coupling, require no further coupling in this embodiment; therefore, the primary and auxiliary BPSK modulation constellation mappings may be identical.

The above-mentioned receivers may process the primary signal and the auxiliary/virtual auxiliary signal at the same service class by diversity combining to obtain desired information; however, it is not thus limited. The streaming service with the lowest resolution (e.g. class 1) may use only the virtual auxiliary signal in the virtual auxiliary channel A1, which is obtained by coupling, for less consumption of radio resources. This means 4 classes of streaming service may be implemented by 4 channels (i.e. 3 primary channels and 1 auxiliary channel).

In the above-mentioned embodiment, the primary signal and auxiliary/virtual auxiliary signal of the same class streaming service may be coupled by using different corresponding modulation constellation mappings. However, the above-mentioned coupling of the auxiliary/virtual auxiliary signal and the primary signal having the same resolution may be implemented with the same modulation constellation mapping.

Figure 3:
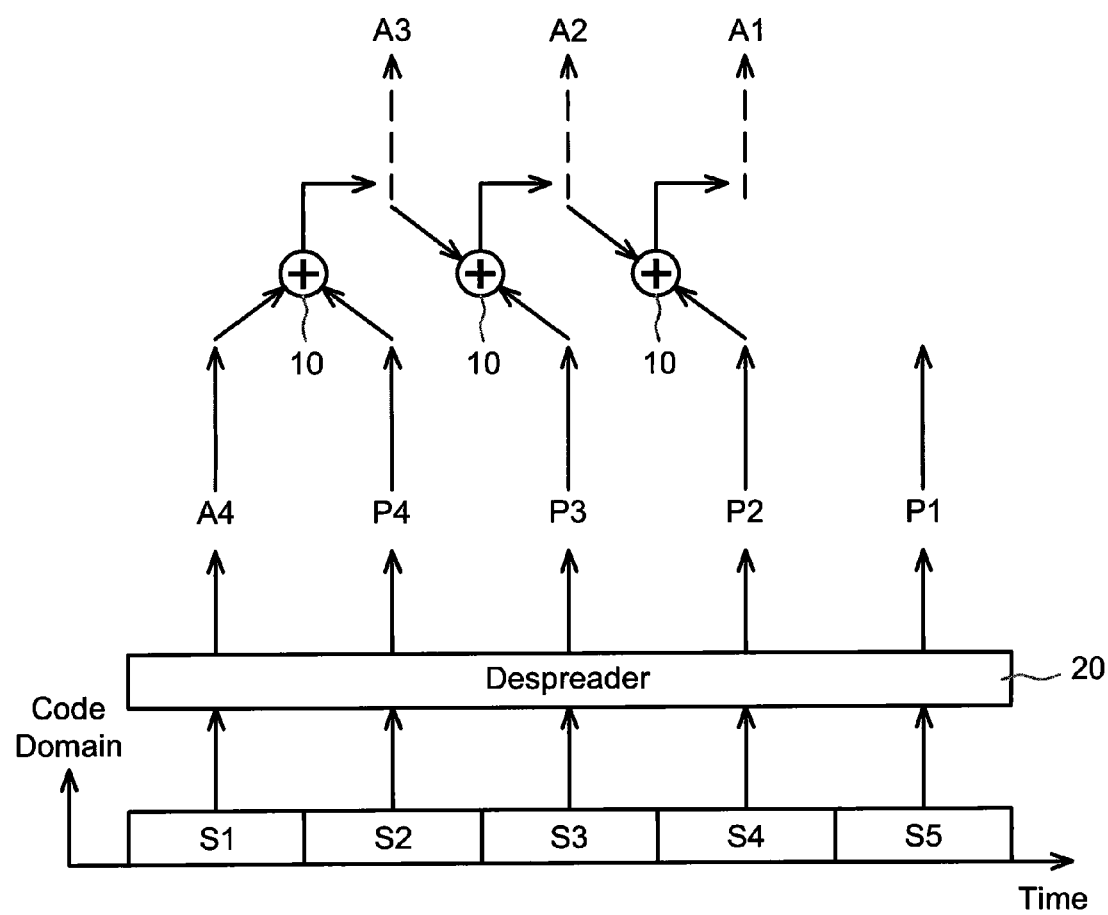
FIG. 3 is a schematic diagram illustrating an application example of a modulation method for transmitting multi-resolution data in CDMA systems according to one embodiment of the present invention.

The modulation method of the present invention may be applied in CDMA (Code Division Multiple Access) systems. Referring to FIG. 3, in one embodiment, symbols S1~S5 are transmitted in the same code channel with different time shifts. Signals equivalent to the primary signals and auxiliary signal transmitted via the primary channels P1~P4 and the auxiliary channel A4 are obtained from the symbols S1~S5 by despreader 20 in the receivers, and then are processed with coupling 10 to obtain the virtual auxiliary signals corresponding to the virtual auxiliary channels A1~A3, as above-mentioned. At last, the primary signal and the auxiliary/virtual auxiliary signal having the same resolution are processed by diversity combining to obtain desired information. In case that there is no primary signal having the same corresponding resolution, the receivers may only demodulate the auxiliary/virtual auxiliary signal to obtain the desired information.

Figure 4:
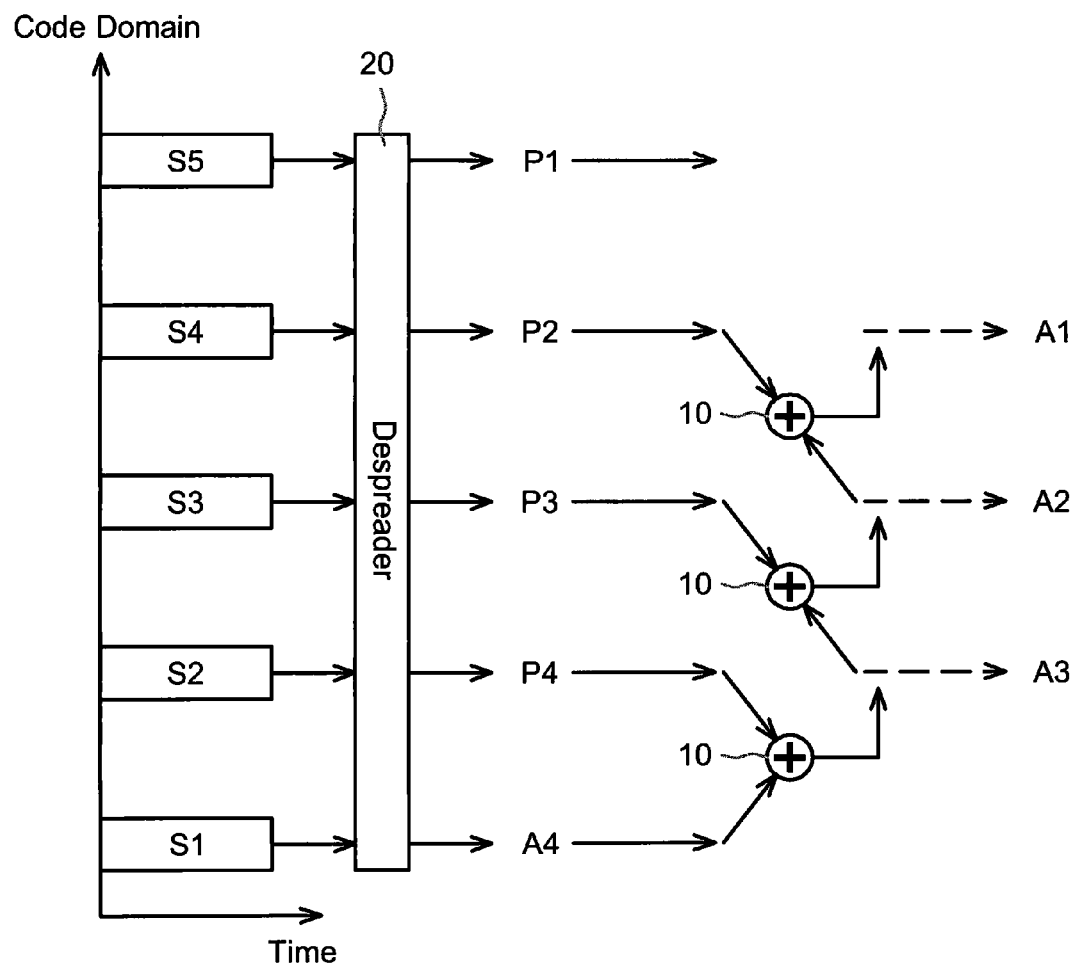
FIG. 4 is a schematic diagram illustrating another application example of a modulation method for transmitting multi-resolution data in CDMA systems according to one embodiment of the present invention.

Referring to FIG. 4, in another embodiment, symbols S1~S5 are respectively transmitted in different code channels. Similarly, signals equivalent to the primary signals and the auxiliary signal transmitted in the primary channels P1~P4 and the auxiliary channel A4 may be obtained from the symbols S1~S5 in the different code channels by despreader 20 and then are processed with coupling 10 to obtain the virtual auxiliary signals corresponding to the virtual auxiliary channels A1~A3, as above-mentioned. In case that there is no primary signal having the same corresponding resolution, the receivers may only demodulate the auxiliary/virtual auxiliary signal to obtain the desired information.

According to the simulation results, it is found that a gain in SNR of streaming services with different resolutions, ranging from 3 dB to 5 dB under the AWGN (Additive white Gaussian noise) channel and ranging from 8 dB to 12 dB under the uncorrelated frequency-selective fading channel, can be obtained by adopting the modulation method of the present invention. Table 1 shows the performance comparison of service coverage under the uncorrelated Rayleigh fading channel for MBMS of conventional art and the present invention. The performance is compared under the desired SER (Symbol Error Rate) equal to $10^{-2}$, and the propagation loss exponent $\beta$ is assumed to be 3 or 4. Referring to Table 1, the coverage range for the MBMS of the present invention can be greatly enhanced over at least 60% for each service class, and the class-2 streaming service is available in the whole service area. Equivalently, if the service coverage is the same as that of conventional MBMS should be maintained, the transmission power can be greatly reduced for the MBMS of the present invention.

TABLE 1

The comparison of service coverage for MBMS of conventional art and the present invention

| Service classes | | Class 1 | Class 2 | Class 3 | Class 4 |
| --- | --- | --- | --- | --- | --- |
| Propagation loss exponent $\beta = 3$ | conventional MBMS | 1 | 0.647 | 0.336 | 0.236 |
| | the present invention | 1.902 | 1.452 | 0.832 | 0.474 |
| | Improvement | 90% | 124% | 148% | 101% |

TABLE 1-continued

The comparison of service coverage for MBMS of conventional art and the present invention

| Service classes | | Class 1 | Class 2 | Class 3 | Class 4 |
|---|---|---|---|---|---|
| Propagation loss exponent $\beta = 4$ | conventional MBMS | 1 | 0.721 | 0.441 | 0.338 |
| | the present invention | 1.620 | 1.323 | 0.871 | 0.572 |
| | Improvement | 62% | 83% | 97% | 69% |

To sum up, the transmitter, receiver, multi-class MBMS and modulation method thereof according to the present invention couple the primary signal and the auxiliary/virtual auxiliary signal having the same resolution to obtain a virtual auxiliary signal with a lower resolution so that each class of streaming service includes the primary signal and the auxiliary/virtual auxiliary signal. Therefore, it may achieve a gain by processing the primary signal with any resolution and the auxiliary/virtual auxiliary signal having the same resolution by diversity combining. The modulation method and system of the present invention may overcome frequency-selective fading and significantly improve the receiving quality so as to improve the overall system throughput and to extend the service coverage.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

The invention claimed is:

1. A multi-class multimedia broadcast/multicast service system, comprising:
   a transmitter configured for transmitting N primary signals via N primary channels and an auxiliary signal via an auxiliary channel, wherein a resolution of said auxiliary signal is identical to the highest resolution of said N primary signals, and constellation mappings of said auxiliary signal and a primary signal having the highest resolution among said N primary signals are coupled to form a corresponding modulation constellation mapping with a lower resolution, and N is a positive integer; and
   at least one receiver, configured for coupling said auxiliary signal or a virtual auxiliary signal and one of said N primary signals having the same resolution to obtain said virtual auxiliary signal with a lower resolution; demodulating one of said N primary signals and said auxiliary signal or said virtual auxiliary signal based on said corresponding modulation constellation mappings, wherein said constellation mappings of said virtual auxiliary signal and one of said N primary signals having the same resolution are coupled to form said corresponding modulation constellation mapping with a lower resolution; and processing one of said N primary signals and said auxiliary signal/said virtual auxiliary signal having the same resolution by diversity combining to obtain desired information, and if there is no primary signal of a corresponding resolution, said receiver demodulates said auxiliary signal or said virtual auxiliary signal independently to obtain the desired information.

2. The multi-class multimedia broadcast/multicast service system according to claim 1, wherein said modulation constellation mapping for said auxiliary signal or said virtual auxiliary signal and said modulation constellation mapping for one of said N primary signals having the same resolution are coupled.

3. The multi-class multimedia broadcast/multicast service system according to claim 1, wherein the modulation technique comprises Binary Phase-Shift Keying (BPSK), Quadrature Phase-Shift Keying (QPSK), 16-Quadrature Amplitude Modulation (16-QAM), 64-Quadrature Amplitude Modulation (64-QAM) or any combination thereof.

4. The multi-class multimedia broadcast/multicast service system according to claim 1, wherein said N primary channels and said auxiliary channel are subcarriers with different frequencies.

5. The multi-class multimedia broadcast/multicast service system according to claim 1, which adopts an Orthogonal Frequency-Division Multiplexing (OFDM) system or an Orthogonal Frequency Division Multiple access (OFDMA) system.

6. The multi-class multimedia broadcast/multicast service system according to claim 1, wherein said N primary channels and said auxiliary channel are different code channels or the same code channel with different time shifts.

7. The multi-class multimedia broadcast/multicast service system according to claim 1, which adopts a code division multiple access (CDMA) system.

8. A transmitter pairing with at least one receiver to form a multi-class multimedia broadcast/multicast service system:
   wherein said receiver is configured for coupling an auxiliary signal or a virtual auxiliary signal and one of N primary signals having the same resolution to obtain a virtual auxiliary signal with a lower resolution and demodulating said auxiliary signal/said virtual auxiliary signal and one of said N primary signals having the same resolution to obtain desired information, and said transmitter is characterized in:
   transmitting said N primary signals via N primary channels; and
   transmitting said auxiliary signal via an auxiliary channel, wherein a resolution of said auxiliary signal is identical to the highest resolution of said N primary signals, and constellation mappings of said auxiliary signal and a primary signal having the highest resolution among said N primary signals are coupled to form a corresponding modulation constellation mapping with a lower resolution, and N is a positive integer.

9. The transmitter according to claim 8, wherein said modulation constellation mapping for said auxiliary signal and said modulation mapping for one of said N primary signals having the same resolution are coupled.

10. The transmitter according to claim 8, wherein the modulation technique comprises Binary Phase-Shift Keying (BPSK), Quadrature Phase-Shift Keying (QPSK), 16-Quadrature Amplitude Modulation (16-QAM), 64-Quadrature Amplitude Modulation (64-QAM) or any combination thereof.

11. The transmitter according to claim 8, wherein said N primary channels and said auxiliary channel are subcarriers with different frequencies.

12. The transmitter according to claim 8, which adopts an Orthogonal Frequency-Division Multiplexing (OFDM) system or an Orthogonal Frequency Division Multiple access (OFDMA) system.

13. The transmitter according to claim 8, wherein said N primary channels and said auxiliary channel are different code channels or the same code channel with different time shifts.

14. The transmitter according to claim 8, which adopts a code division multiple access (CDMA) system.

15. A receiver pairing with a transmitter to form a multi-class multimedia broadcast/multicast service system, wherein said transmitter transmits N primary signals via N primary channels and an auxiliary signal via an auxiliary channel, wherein a resolution of said auxiliary signal is identical to the highest resolution of said N primary signals, and constellation mappings of said auxiliary signal and a primary signal having the highest resolution among said N primary signals are coupled to form a corresponding modulation constellation mapping with a lower resolution, and N is a positive integer, and said receiver is characterized in:
- coupling said auxiliary signal or a virtual auxiliary signal and one of said N primary signals having the same resolution to obtain said virtual auxiliary signal with a lower resolution;
- demodulating one of said N primary signals and said auxiliary signal or said virtual auxiliary signal based on said corresponding modulation constellation mapping, wherein said constellation mappings of said virtual auxiliary signal and one of said N primary signals having the same resolution are coupled to form said corresponding modulation constellation mapping with a lower resolution; and
- processing one of said N primary signals and said auxiliary signal/said virtual auxiliary signal by diversity combining to obtain desired information, and if there is no primary signal of a corresponding resolution, said receiver demodulates said auxiliary signal or said virtual auxiliary signal independently to obtain the desired information.

16. The receiver according to claim 15, wherein said modulation constellation mapping for said auxiliary signal or said virtual auxiliary signal and said modulation constellation mapping for one of said N primary signals having the same resolution are coupled.

17. The receiver according to claim 15, wherein the modulation technique comprises Binary Phase-Shift Keying (BPSK), Quadrature Phase-Shift Keying (QPSK), 16-Quadrature Amplitude Modulation (16-QAM), 64-Quadrature Amplitude Modulation (64-QAM) or any combination thereof.

18. The receiver according to claim 15, wherein said N primary channels and said auxiliary channel are subcarriers with different frequencies.

19. The receiver according to claim 15, which adopts an Orthogonal Frequency-Division Multiplexing (OFDM) system or an Orthogonal Frequency Division Multiple access (OFDMA) system.

20. The receiver according to claim 15, wherein said N primary channels and said auxiliary channel are different code channels or the same code channel with different time shifts.

21. The receiver according to claim 15, which adopts a code division multiple access (CDMA) system.

22. A modulation method for transmitting multi-resolution data comprising:
- transmitting N primary signals via N primary channels and an auxiliary signal via an auxiliary channel, wherein a resolution of said auxiliary signal is identical to the highest resolution of said N primary signals, and constellation mappings of said auxiliary signal and a primary signal having the highest resolution among said N primary signals are coupled to form a corresponding modulation constellation mapping with a lower resolution, and N is a positive integer;
- coupling said auxiliary signal and one of said N primary signals having the highest resolution to obtain a virtual auxiliary signal with a lower resolution and demodulating one of said N primary signals and said auxiliary signal based on said corresponding modulation constellation mappings, wherein said constellation mappings of said virtual auxiliary signal and one of said N primary signals having the same resolution are coupled to form said corresponding modulation constellation mapping with a lower resolution; and
- processing one of said N primary signals and said auxiliary signal/said virtual auxiliary signal by diversity combining to obtain desired information, and if there is no primary signal of a corresponding resolution, the receiver demodulates said auxiliary signal or said virtual auxiliary signal independently to obtain the desired information.

23. The modulation method for transmitting multi-resolution data according to claim 22 further comprising:
- coupling said auxiliary signal or said virtual auxiliary signal and one of said N primary signals having the same resolution to obtain said virtual auxiliary signal with a lower resolution.

24. The modulation method for transmitting multi-resolution data according to claim 22, wherein said modulation constellation mapping for said auxiliary signal or said virtual auxiliary signal and said modulation constellation mapping for one of said N primary signals having the same resolution are coupled.

25. The modulation method for transmitting multi-resolution data according to claim 22, wherein the modulation technique comprises Binary Phase-Shift Keying (BPSK), Quadrature Phase-Shift Keying (QPSK), 16-Quadrature Amplitude Modulation (16-QAM), 64-Quadrature Amplitude Modulation (64-QAM) or any combination thereof.

26. The modulation method for transmitting multi-resolution data according to claim 22, wherein said N primary channels and said auxiliary channel are subcarriers with different frequencies.

27. The modulation method for transmitting multi-resolution data according to claim 22, which is applied in an Orthogonal Frequency-Division Multiplexing (OFDM) system or an Orthogonal Frequency Division Multiple access (OFDMA) system.

28. The modulation method for transmitting multi-resolution data according to claim 22, wherein said N primary channels and said auxiliary channel are different code channels or the same code channel with different time shifts.

29. The modulation method for transmitting multi-resolution data according to claim 22, which is applied in a code division multiple access (CDMA) system.

\* \* \* \* \*